(12) United States Patent
Menard et al.

(10) Patent No.: US 10,144,391 B2
(45) Date of Patent: Dec. 4, 2018

(54) ELECTRONICS UNIT, METHOD CARRIED OUT IN AN ELECTRONICS UNIT OF SAID TYPE, METHOD FOR SHARING A TIME FRAME BETWEEN A SERVER AND AN ELECTRONICS UNIT, AND METHOD FOR SYNCHRONIZING A SERVER AND AN ELECTRONICS UNIT

(71) Applicant: VALEO COMFORT AND DRIVING ASSISTANCE, Créteil (FR)

(72) Inventors: Eric Menard, Créteil (FR); Bruno Benteo, Créteil (FR); Aymeric Chalochet, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/536,433

(22) PCT Filed: Dec. 22, 2015

(86) PCT No.: PCT/FR2015/053716
§ 371 (c)(1),
(2) Date: Jun. 15, 2017

(87) PCT Pub. No.: WO2016/108011
PCT Pub. Date: Jul. 7, 2016

(65) Prior Publication Data
US 2017/0349143 A1 Dec. 7, 2017

(30) Foreign Application Priority Data

Dec. 30, 2014 (FR) ...................................... 14 63431

(51) Int. Cl.
*B60R 25/24* (2013.01)
*G07C 9/00* (2006.01)
(Continued)

(52) U.S. Cl.
CPC .......... *B60R 25/24* (2013.01); *G07C 9/00309* (2013.01); *G07C 9/00571* (2013.01);
(Continued)

(58) Field of Classification Search
CPC .............. B60R 25/24; B60R 2325/108; B60R 2325/205; G07C 9/00309; G07C 9/00571; H04L 9/14; H04L 9/3271
See application file for complete search history.

(56) References Cited

U.S. PATENT DOCUMENTS

2005/0206499 A1* 9/2005 Fisher ................. E05B 19/0005
340/5.73
2009/0170539 A1* 7/2009 Kortge ................ H04L 63/1441
455/466

(Continued)

FOREIGN PATENT DOCUMENTS

EP 1 271 418 A1 1/2003
EP 2 743 868 A1 6/2014

OTHER PUBLICATIONS

International Search Report issued in PCT/FR2015/053716 dated Apr. 13, 2016 (3 pages).

(Continued)

*Primary Examiner* — Nabil Syed
(74) *Attorney, Agent, or Firm* — Osha Liang LLP

(57) ABSTRACT

The invention relates to an electronics unit (11) to be fit in a vehicle (10) and designed to control a functionality of the vehicle (10) upon receipt of a request from a user terminal (20), characterized in that same comprises:—a memory unit designed to store a counter and data representing a duration;—means for periodically modifying the value of the counter, the period of time being equal to said duration;—control means for controlling said functionality only when the counter is within a given range of values. Also disclosed are a method carried out in an electronics unit of said type, (Continued)

a method for sharing a time frame between a server and an electronics unit, and a method for synchronizing a server and an electronics unit.

8 Claims, 3 Drawing Sheets

(51) Int. Cl.
*H04L 9/14* (2006.01)
*H04L 9/32* (2006.01)

(52) U.S. Cl.
CPC .............. *H04L 9/14* (2013.01); *H04L 9/3271* (2013.01); *B60R 2325/108* (2013.01); *B60R 2325/205* (2013.01); *H04L 2209/80* (2013.01)

(56) References Cited

U.S. PATENT DOCUMENTS

2014/0068247 A1* 3/2014 Davis .................. B60R 25/24
 713/155
2014/0129113 A1 5/2014 Van Wiemeersch et al.

OTHER PUBLICATIONS

Written Opinion of the International Searching Authority issued in PCT/FR2015/053716 dated Apr. 13, 2016 (6 pages).

* cited by examiner

ELECTRONICS UNIT, METHOD CARRIED OUT IN AN ELECTRONICS UNIT OF SAID TYPE, METHOD FOR SHARING A TIME FRAME BETWEEN A SERVER AND AN ELECTRONICS UNIT, AND METHOD FOR SYNCHRONIZING A SERVER AND AN ELECTRONICS UNIT

TECHNICAL FIELD OF THE INVENTION

The present invention relates to the control of functionalities of a vehicle by means of a user terminal, such as a cell phone.

It relates more particularly to an electronics unit, a method carried out in an electronics unit of said type, a method for sharing a time frame between a server and an electronics unit, and a method for synchronizing a server and an electronics unit.

The invention is used particularly advantageously in the case where the controlled functionality is the unlocking of the doors of the vehicle.

TECHNOLOGICAL BACKGROUND

It has been proposed to control certain functionalities of a motor vehicle, such as the unlocking of the doors of the vehicle, by means of a user terminal, for example a cell phone commonly used by the user of the vehicle.

In order to allow this control only to the persons who are indeed authorized, a virtual key is used which is stored in the user terminal and for which an electronic control unit of the vehicle verifies the validity before controlling the unlocking of the doors.

In some cases, such as for example in the context of vehicle rental, it can also be desirable that this possibility of controlling the functionality by means of the user terminal is limited over time.

OBJECT OF THE INVENTION

In this context, the present invention proposes an electronics unit intended to be fitted in a vehicle and designed to control a functionality of the vehicle upon receiving a request from a user terminal, characterized in that it comprises:

- a storage unit designed to store a counter and an item of data representing a duration;
- means for periodically modifying the value of the counter, with a period equal to said duration;
- control means for controlling said functionality only when the counter is within a given range of values.

A dedicated counter is thus used to limit, over time, the possibilities of controlling the functionality by means of the user terminal. Such a counter can be varied, i.e. different from one vehicle to another, since it is initialized with a specific value and modified with a specific period, which is stored in the electronics unit. Such a counter is thus more difficult to falsify than a conventional time frame, such as the clock of the vehicle.

The means for periodically modifying the value of the counter and the control means can be implemented in practice by a processor and by computer program adapted instructions, which instructions are stored in a memory associated with the processor. In an alternative, these means could be implemented by a dedicated electronic circuit, for example an application-specific integrated circuit, commonly called an ASIC.

Other features proposed as optional, and therefore not limiting, are as follows:

- the electronics unit comprises means for receiving a lower limit and an upper limit and the given range of values is defined between said lower limit and said upper limit;
- the electronics unit comprises means for deriving a virtual key on the basis of a root key and the lower and upper limits received;
- the electronics unit comprises means for sending a challenge to the user terminal, means for calculating an expected response according to the virtual key and to the challenge and means for receiving a response from the user terminal;
- the control means are designed to control said functionality only when the received response corresponds to the expected response;
- the periodic modification of the counter is a periodic incrementation of the counter;
- said functionality is the unlocking of the vehicle doors and/or the starting of the vehicle.

The functionality can also be the locking of the vehicle doors, or the locking or unlocking of the vehicle trunk, or the locking or unlocking of the vehicle glove box, or the starting or stopping of the vehicle engine.

The invention also proposes a method carried out in an electronics unit as proposed above, comprising the following steps:

- mutual authentication of the electronics unit and of a server;
- in case of successful mutual authentication, initialization of the counter with an initial value stored in the storage unit.

It can also be envisaged that the initialization of the counter is performed only when an action of a user on a physical object linked to the vehicle (for example a physical key of the vehicle or a manual control of the vehicle) is detected.

The invention also proposes a method for sharing a time frame between a server and an electronics unit of a vehicle, comprising the implementation, by the electronics unit, of a method as has just been described, and the following steps:

- initializing a counter within the server with said initialization value, stored at the server;
- periodically modifying the counter stored within the server with a period equal to said duration.

The invention further proposes a method for synchronizing a server and an electronics unit as set forth above, comprising the following steps:

- mutual authentication of the electronics unit and of the server;
- in the event of successful mutual authentication, transmitting, to the electronics unit, a current value of a counter stored at the server, and initializing the counter stored in the storage unit of the electronics unit with said current value.

According to a possible alternative, such a method for synchronizing a server and an electronics unit as presented above comprises the following steps:

- entering the item of representative data and an initial value into the storage unit during a stage of producing the electronics unit;
- at each synchronization of the server and of the electronics entity, initializing the counter with said initial value, i.e. without transmission of values from the server to the electronics unit.

DETAILED DESCRIPTION OF AN EXEMPLARY EMBODIMENT

The following description with reference to the appended drawings, which are given as non-limiting examples, will clearly explain the features of the invention and how it can be carried out.

In the appended drawings:

FIG. 1 shows a context example in which the invention can be carried out, comprising, in particular, a vehicle and a user terminal;

FIG. 2 schematically shows components, useful for understanding the invention, of the vehicle and of the user terminal of FIG. 1;

Figure 1:
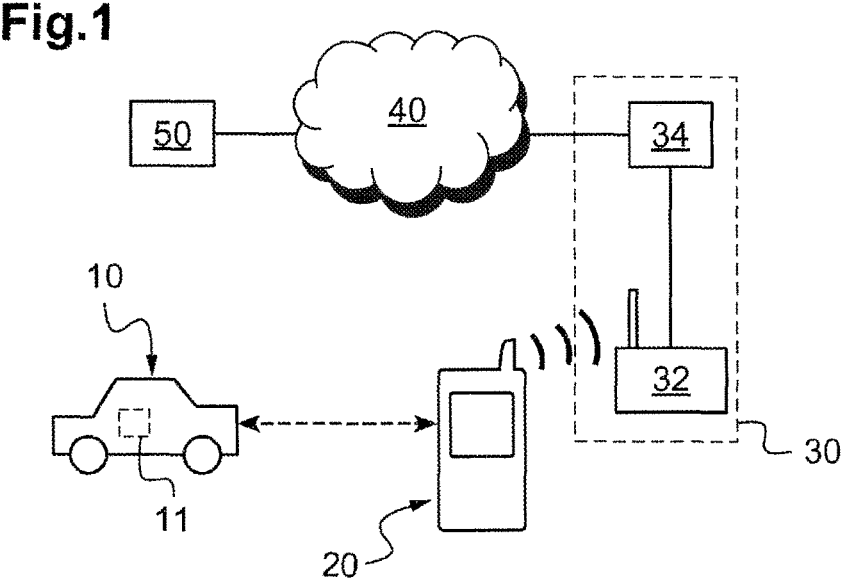
FIG. 1 shows a context example in which the invention can be carried out.

In this context, a vehicle 10 comprises an electronic control unit (ECU) 11 which can communicate via a wireless link with a user terminal 20, for example a cell phone, possibly of "smartphone" type, in order to exchange data with this user terminal 20, for example for controlling functionalities of the vehicle 10 by means of the user terminal 20 (wherein such functionality can be, for example, the unlocking of the doors of the vehicle 10), as explained below.

The wireless link used to communicate between the electronic control unit 11 and the user terminal 20 is, for example, of Bluetooth type.

The user terminal 20 is furthermore designed to connect to a cell phone network 30 which comprises, in particular, a base station 32 in communication, via a radio link, with the user terminal 20 and a gateway 34 for connection to a public network 40, for example the Internet.

A server 50 is also connected to the public network 40 so that the user terminal 20 and the server 50 can communicate and exchange data via the cell phone network 30 and the public network 40. The server 50 is, in this case, managed by the manufacturer of the electronic control unit 11.

Figure 2:
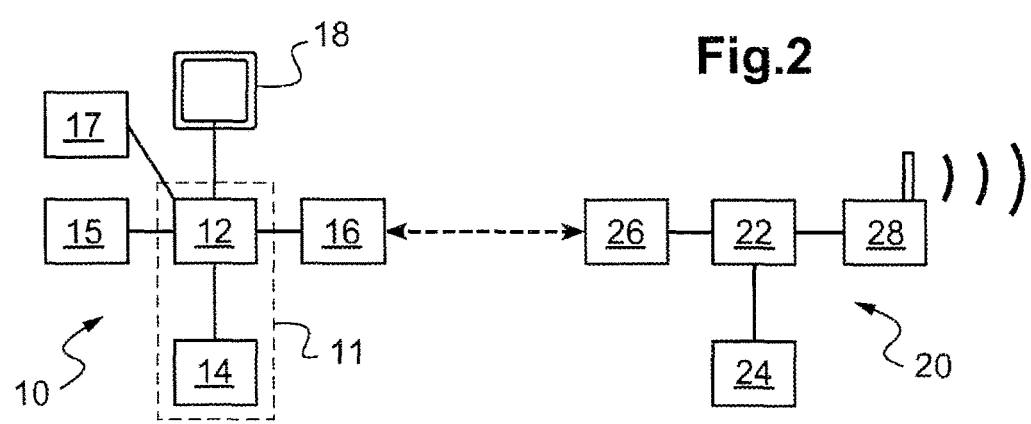

FIG. 2 schematically shows components, useful for understanding the invention, of the vehicle 10 and of the user terminal 20.

The vehicle 10 comprises in particular the electronic control unit 11 already mentioned, an actuator 15 (designed in this case to allow the doors of the vehicle 10 to be unlocked), an actuator 17 (designed to allow the vehicle to start), a wireless communication module 16 and a user interface 18.

An identification number VIN (Vehicle Identification Number) is assigned to the vehicle 10 and a serial number N is assigned to the electronic control unit 11. The association between the identification number VIN of a vehicle 10 and the serial number N of the electronic control unit 11 with which this vehicle 10 is provided is kept in a database D managed by the server 50 (which can be the maker of the vehicle 10 or a supplier).

The electronic control unit comprises a processor 12 and a storage unit 14, for example a rewritable non-volatile memory or a hard disk.

The storage unit 14 stores, in particular, computer programs comprising instructions, the execution of which by the processor 12 allows the electronic control unit 11 to carry out the methods described below.

The storage unit 14 also stores data used as part of the methods described below, in particular a cryptographic key PrK (for example a private key) and a root key (or master key) MK, used as explained hereafter.

The cryptographic key PrK and/or the root key MK are written, for example, in the storage unit 14 during the manufacture of the electronic control unit 11, before this electronic control unit 11 is mounted in the vehicle 10.

The cryptographic key PrK and the root key MK are also stored at the server 50 (as stated, it is managed by the manufacturer of the electronic control unit 11), in association with the serial number N of the electronic control unit 11.

The storage unit 14 also stores construction information for a varied counter, for example an initial value I of the counter and a duration of step P. This information can also be written into the storage unit 14 during the manufacture of the electronic control unit 11, before mounting this electronic control unit 11 in the vehicle 10, and is stored elsewhere at the server 50, in association with the serial number N of the electronic control unit 11.

This counter is varied in the sense that the construction information for the counter (in this case the initial value I and the duration of the step P) differ from one electronic control unit to the other, and therefore from one vehicle to another. In other words, each electronic control unit (and thus each vehicle) stores counter construction information that is specific thereto. The server S thus stores, as already indicated, this construction information for the counter in association with each electronic control unit serial number.

The user terminal 20 comprises a processor 22, a memory 24 (for example a rewritable non-volatile memory), a wireless communication module 26 and a module 28 for communication on the cell phone network 30.

The wireless communication module 26 of the user terminal 20 makes it possible to establish a wireless link (in this case of Bluetooth type as already indicated) with the wireless communication module 16 of the vehicle 10 through which the processor 12 of the electronic control unit 11 and the processor 22 of the user terminal 20 can exchange data, in particular as explained further below.

The communication module 28 allows the user terminal 20 (and precisely the processor 22 with which this user terminal 20 is provided) to exchange, as already indicated, data with other devices connected to the cell phone network 30 or to the public network 40, in particular with the server 50. In some embodiments, the communication module can comprise a smart card which stores connection data associated with a subscription to the cell phone service and making it possible to establish the connection to the cell phone network 30.

Figure 3:
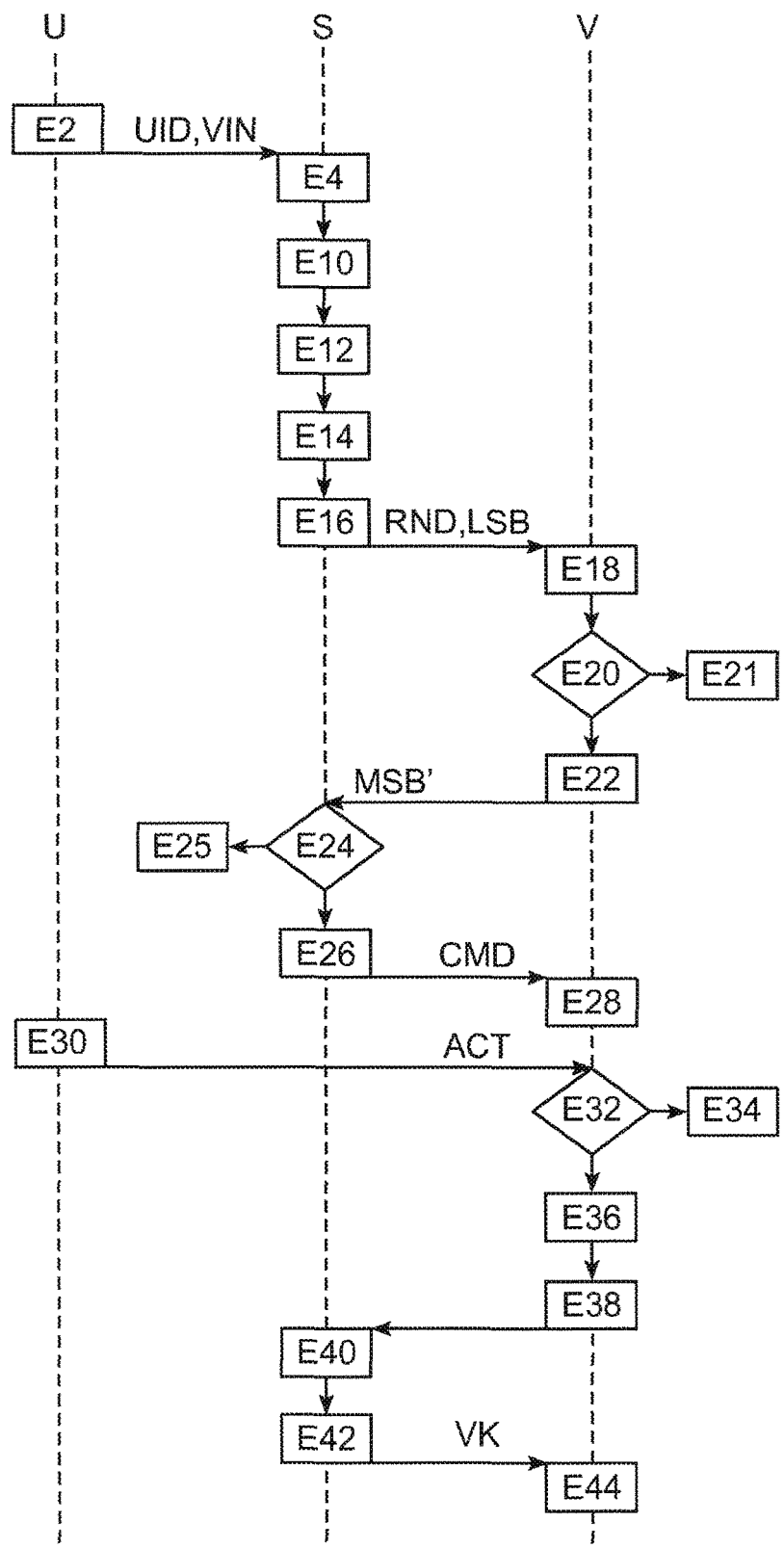
FIG. 3 shows the main the steps of a method for registering with a service for controlling functionalities of the vehicle by means of the user terminal.

FIG. 3 shows the main steps of a method for registering with (or joining) a service for controlling functionalities of the vehicle 10 by means of the user terminal 20.

It is pointed out that, prior to carrying out such a method, the user terminal 20 is not specifically prepared for controlling functionalities of the vehicle 10 and does not comprise any data associated with the vehicle 10. It can thus be, for example, the cell phone commonly used by the owner of the vehicle 10.

Similarly, before carrying out the method, the user terminal 20 is unknown to the vehicle 10 which therefore does not have knowledge of any data associated with this user terminal 20.

It is considered that, for carrying out the method of FIG. 3, a user U (in this case a person responsible for operating the vehicle 10) has access to the vehicle 10 (also referenced V in FIG. 3) by conventional means (for example, a physical key).

In the embodiment described in this case, the user U carries and uses the user terminal 20 which, as described above, is in communication firstly with the electronic control unit 11 via a wireless link (for example of Bluetooth type) and secondly with the server 50 (referenced S in FIG. 3) via a radio link up to the base station 31, then via the cell phone network 30 and the public network 40.

The user terminal 20 can thus be used, in the embodiment described in this case, as a gateway allowing an exchange of data between the vehicle V (precisely the electronic control unit 11) and the server S, as described hereafter.

Alternatively, other means of communication between the vehicle V (i.e. the electronic control unit 11) and the server S could be used, for example a communication module with which the vehicle V is provided and which is designed to establish a (direct) communication between the vehicle V and the cell phone network 30.

The method of FIG. 3 starts at the step E2 at which the user U communicates to the server S (referenced 50 in FIG. 1) a user identifier UID and an identifier VIN of the vehicle V (referenced 10 in FIG. 1). In a possible embodiment, the user U connects, for this purpose, to the server S (for example by entering the http address of the server S in a browser executed by the processor 22 of the user terminal 20) and enters, for example, the aforementioned identifiers UID, VIN in a form then transmitted to the server S. In another possible embodiment, an application previously installed on the user terminal 20 asks the user U to enter the identifiers and transmits them to the server 50.

For example, the user identifier UID comprises the name of the company that will offer the vehicle for rental. Alternatively, another type of data could, however, be used to identify the user; thus, the user identifier could be an electronic address, a telephone number (for example the number assigned to the subscription to the cell phone service, such as an MSISDN number) or an identifier of the user terminal of the user U (such as an IMEI number).

The vehicle identifier VIN is, for example, of "Vehicle Identification Number" type.

The server S receives the user identifier U and the vehicle identifier VIN in the step E4 and stores these identifiers, in this step in a zone dedicated to the vehicles for which registration to the service for controlling functionalities of the vehicle by means of the user terminal is in progress.

The serial number N of the electronic control unit 11 is, for example, communicated by the user U to the server S, for example during the step E2. For this purpose, the serial number N is supplied to the user beforehand: for example, it is printed on a label stuck in the user manual of the vehicle and/or can be accessed by the user by means of the user interface 18.

The server S can thus determine, in the step E10, the stored cryptographic key PrK (as described above) in association with this serial number N.

The server S then generates a challenge, for example a random number RND (step E12).

The server S then calculates, in the step E14, a response RESP associated with this challenge by applying a cryptographic function f using the cryptographic key PrK, which can be written as: RESP=f(RND,PrK).

The server S can thus send, in the step E16, the challenge RND and a part of the response RESP, in this case a least significant word LSB (Least Significant Byte) forming part of the response RESP, to the vehicle V, precisely to the electronic control unit 11.

As indicated above, the server S (referenced 50 in FIG. 1) communicates, in this case, with the electronic control unit 11 via the user terminal 20.

The electronic control unit 11 receives the challenge RND and the response part LSB and in turn calculates, in the step E18, the expected response RESP' by applying, to the challenge RND received, the cryptographic function f using the cryptographic key PrK stored as indicated above in the storage unit 14: RESP'=f(RND,PrK).

The electronic control unit 11 then verifies, in the step E20, that the part LSB' (corresponding to the part of the response RESP received, in this case the least significant word) of the response RESP' calculated in the step E18 is indeed identical to the response part LSB received from the server S.

If this identicalness is not verified, the electronic control unit 11 carries out the step E21 which terminates the registration process. Indeed, this means that the cryptographic key used in the calculation of the step E14 differs from that used in the calculation of the step E18 and that an error has therefore occurred (for example due to sending an incorrect vehicle identifier in the step E2). An error message can then, for example, be displayed on the user interface 18 of the vehicle V.

If identicalness is verified, the electronic control unit 11 sends, in the step E22, another part of the response RESP' calculated in the step E18, in this case a most significant word MSB' (Most Significant Byte), to the server S.

The server S receives this other part MSB' of the response RESP' and verifies, in the step E24, that the part MSB (corresponding to the part MSB' of the response RESP' received, in this case the most significant word) of the response RESP calculated in the step E14 is indeed identical to the response part MSB' received from the electronic control unit 11.

If this identicalness is not verified, the server carries out the step E25 which terminates the registration processor. Indeed, this means that the partner of the server S in the communication has not been able to calculate the expected response, in all likelihood as the partner is not the expected vehicle and therefore does not hold the cryptographic key PrK.

In normal operation, identicalness is verified and a mutual authentication has thus been performed between the server S and the electronic control unit 11.

The server S then triggers the continuation of the registration method by sending, to the electronic control unit 11, a command CMD for verifying the presence of the user U in the vehicle V (step E26).

On receipt of the command CMD, the electronic control unit 11 controls, in the step E28, the generation via the user interface 18 of an indication requesting the user U to undertake one or more actions ACT.

This indication can be a visual indication (for example a light signal or a display on a screen of the user interface 18) and/or a sound indication (for example a particular sound or a voice message). The action or actions requested can comprise the use of the physical key (for example, pressing, possibly simultaneously, on one or more buttons of the physical key, or starting and/or stopping the engine with the physical key) and/or an action of the user U on the vehicle V, for example pressing on a button of the user interface 18, opening and/or closing a door, and/or starting and/or stopping the engine.

The user undertakes the requested action (or actions) ACT in the step E30.

The electronic control unit 11 detects, in the step E32, whether the action undertaken by the user U indeed corresponds to the requested action ACT (for example, by leaving a predetermined duration for the user to complete the action).

In the event of failure (i.e. if the user U does not undertake the requested actions within the prescribed time period), the electronic control unit 11 carries out the step E34 which terminates the registration process. An error message can also be displayed on the user interface 18 of the vehicle V.

However, if the user correctly undertakes the requested actions ACT within the prescribed time, it is considered that all the conditions required to undertake the registration are fulfilled and that the service for controlling functionalities of the vehicle by means of the user terminal can be started.

It is pointed out that it is possible to envisage other conditions for validating the registration, for example entering, at the user interface 18 of the vehicle 10, a one-time use code received and displayed by the user terminal 20. Such a one-time use code can be sent by the server 50 to the user terminal 20 via the public network 40, for example during the execution of the application allowing, in some embodiments, the entry of the identifiers in the step E2, as indicated above. Alternatively, the one-time use code could be transmitted (for example, in the form of a short message or SMS, meaning "Short Message System") to the user terminal 20 by using the telephone number (MSISDN number) associated with the subscription used by the user terminal 20, in particular when this number forms the user identifier, as also envisaged above. In the latter case, the server 50 is designed to send data over the telephone network.

A counter is then started within the electronic control unit 11, using the construction information stored in the storage unit 14 as already indicated: in the embodiment described in this case, the counter is initialized to the initial value I and incremented periodically with the period P (step E36). When the counter is stored over a given number of bits, it is reset to zero during an incrementation resulting in an overflow of the maximum value (determined by the number of bits of the counter).

The electronic control unit 11 also sends, to the server S, a message indicating that the presence of the user has been detected (by the actions ACT that the user has undertaken at the request of the electronic control unit 11) and that the service can therefore be started (step E38).

The server S receives this message and also starts the counter therein (step E40), in association with the vehicle identifier VIN and on the basis of the construction information stored in association with the serial number N of the electronic control entity 11, in this case the initial value I and the period P for incrementation of the counter.

The counter therefore advances simultaneously within the control unit 11 and within the server S, with possibly a very small gap between the counter stored in the electronic control unit 11 and the counter stored in the server 50 (due in particular to the short duration separating the steps E36 and E40), which is not however detrimental.

The server S can then decide on the definitive registration with the service and stores, for this purpose, in association, in an area for storing the subscribers to the service, the user identifier UID, the vehicle identifier VID and, in the case where a counter is used, the current value of the counter (which will be incremented periodically with the period P), and possibly the serial number N (step E42). The user identifier UID and the vehicle identifier VID stored in association can be considered as an electronic certificate of ownership of the vehicle for the proposed service.

The server S can then communicate, to the user U, rights of access to the service for controlling the functionalities of the vehicle, for example by transmitting to the user terminal 20 a virtual key VK authorizing the user terminal 20 to control these functionalities (for example, opening the doors of the vehicle), as in the examples presented below. The virtual key VK is stored in the user terminal 20 (step E44). In practice, the virtual key VK can be transmitted from the server 50 to an application previously downloaded into the memory 24 of the user terminal 20 and executable by the processor 22 of the user terminal 20, for example the application for carrying out the step E2 as envisaged above. Alternatively, the virtual key VK could be transmitted to the user terminal 20 using the telephone number (MSISDN number) associated with the subscription used by the user terminal 20, in particular when this number forms the user identifier, as also envisaged above.

In the embodiment described in this case, the virtual key VK is, for example, a temporary key, constructed as described below, allowing the personnel of the vehicle rental company to have access to the vehicle while waiting for this vehicle to be actually rented.

Figure 4:
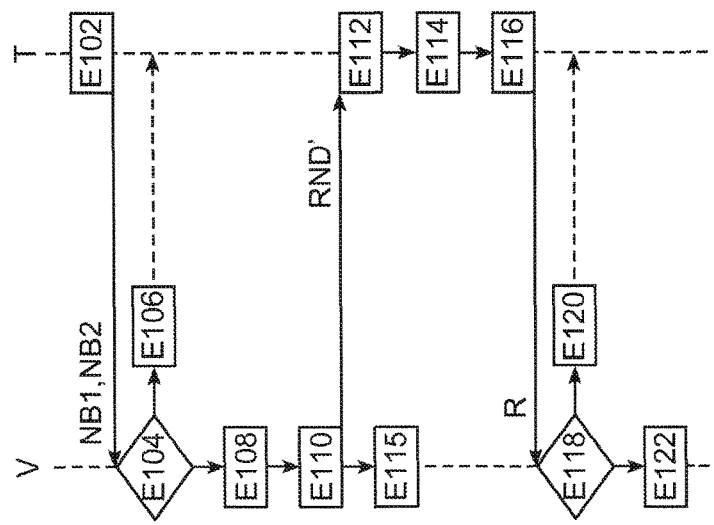
FIG. 4 shows the main the steps of a method example for controlling a functionality of the vehicle by means of the user terminal.

FIG. 4 shows the main the steps of a method example for controlling a functionality of the vehicle V (referenced 10 in FIG. 1) by means of the user terminal T (of the type referenced 20 in FIG. 1).

Steps other than those described below can naturally be carried out in practice, particularly in advance in order to establish a channel of communication between the electronic control unit 11 of the vehicle 10 and the user terminal 20.

The control method described in this case is particularly well suited to the case where the vehicle V is rented to a user for a predefined period of time.

For this purpose, a temporary virtual key VK is used, which is derived by taking account of the value NB1 of the counter (installed in parallel in the electronic control unit 11 of the vehicle V and in the server S as indicated above) at the beginning of the rental period and the value NB2 of the counter at the end of the rental period.

In order to generate the virtual key VK, the server S receives, for example, from the vehicle rental company, the vehicle identifier VIN, the rental start time and the rental end time and determines, based on the counter construction information read in the storage unit 14, the value NB1 of the counter placed in the electronic control unit 11 in question (the serial number N of which is associated with the vehicle identifier VIN received, for example following the method of FIG. 3) and corresponding to the rental start time, and the value NB2 of this counter corresponding to the rental end time.

The virtual key VK is then generated using the root key MK (stored as indicated above in association with the serial number N), the start value NB1 and the end value NB2, for example by applying a derivation function g to these elements: VK=g(MK,NB1,NB2).

The server S then transmits the virtual key VK and the values NB1, NB2 to the usual terminal T (for example a cell phone) of the user (person renting the vehicle), for example after a step of verifying that this usual terminal T is indeed eligible for the service (on the basis of an identifier of the terminal, such as an IMEI number, and/or a subscriber number associated with the terminal, such as an MSISDN number); the virtual key VK and the values NB1, NB2 are then stored within the terminal T. (It is pointed out that the terminal T used in this case is therefore generally not the one used in the context of FIG. 3.)

It is then possible to control functionality of the vehicle V by means of the terminal T.

For this purpose, in the step E102, the terminal T sends a request for carrying out the functionality, accompanied by the start value NB1 and the end value NB2, to the electronic control unit 11 of the vehicle V (step E102).

The electronic control unit 11 then verifies, in the step E104, that the current value of the counter which it uses is indeed between the value NB1 and the value NB2 (which means, according to the above-described construction of the values NB1 and NB2, that the current instant is within the rental period).

If not, the electronic control unit 11 terminates the method in the step E106 without undertaking the required functionality (i.e. in this case without unlocking the doors of vehicle V). A failure message can possibly be transmitted to the terminal T for displaying, on the terminal T, a corresponding indication.

In the event of positive verification in the step E104, the method continues to the step E108 in which the electronic control unit 11 calculates the virtual key VK on the basis of the root key MK (stored, as indicated above, in the storage unit 14), the start value NB1 and the end value NB2, according to the same calculation as that undertaken as indicated above within the server S, in this case by applying the derivation function g to these elements: in this case, the electronic control unit 11 calculates VK=g(MK,NB1,NB2).

The electronic control unit 11 then generates, in the step E110, a challenge, for example a random number RND', and sends this challenge to the user terminal T.

The user terminal T receives this challenge in the step E112.

In the step E114, the user terminal T (i.e. in practice the processor thereof) applies, to the received challenge RND', a cryptographic function h using the virtual key VK (received from the server S in advance as indicated above) and thus obtains a response R: R=h(RND',VK). Other data can possibly be used in the calculations undertaken in this step, for example the vehicle identifier VIN.

Simultaneously, the electronic control unit undertakes, in the step E115, an identical calculation (in normal operation) in order to obtain, for the part thereof, the expected response; in this case R' is noted as the result of this calculation: R'=h(RND',VK).

The user terminal T sends the expected response R (calculated in the step E114) to the electronic control unit 11 (step E16).

The electronic control unit 11 then verifies, in the step E118, that the response R received from the user terminal T is indeed identical to the expected response R', at which terminal the electronic control unit 11 can consider that the user terminal T indeed holds the virtual key VK which gives a right of access to the vehicle.

If the verification fails in the step E118 (which is not the case in the normal operation described above, but is perhaps the case when a malicious person tries to access the vehicle without knowing the virtual key VK), the electronic control unit 120 terminates the method in the step E120 without undertaking the required functionality (i.e. in this case without unlocking the doors of the vehicle V). A failure message can possibly be transmitted to the terminal T for displaying a corresponding indication on the terminal T.

When the response R received from the user terminal T and the expected response R' calculated by the electronic control unit 11 are verified as identical in the step E118, the step E122 is carried out, in which step the electronic control unit undertakes the requested functionality, in this case the unlocking of the doors of the vehicle, by sending a corresponding command to the actuator 15 (or, in the case of starting the vehicle, to the actuator 17).

In the example that has just been described, a simple authentication is used; it is possible, however, to alternatively use a mutual authentication, for example when the desired functionality is to start the vehicle.

Figure 5:
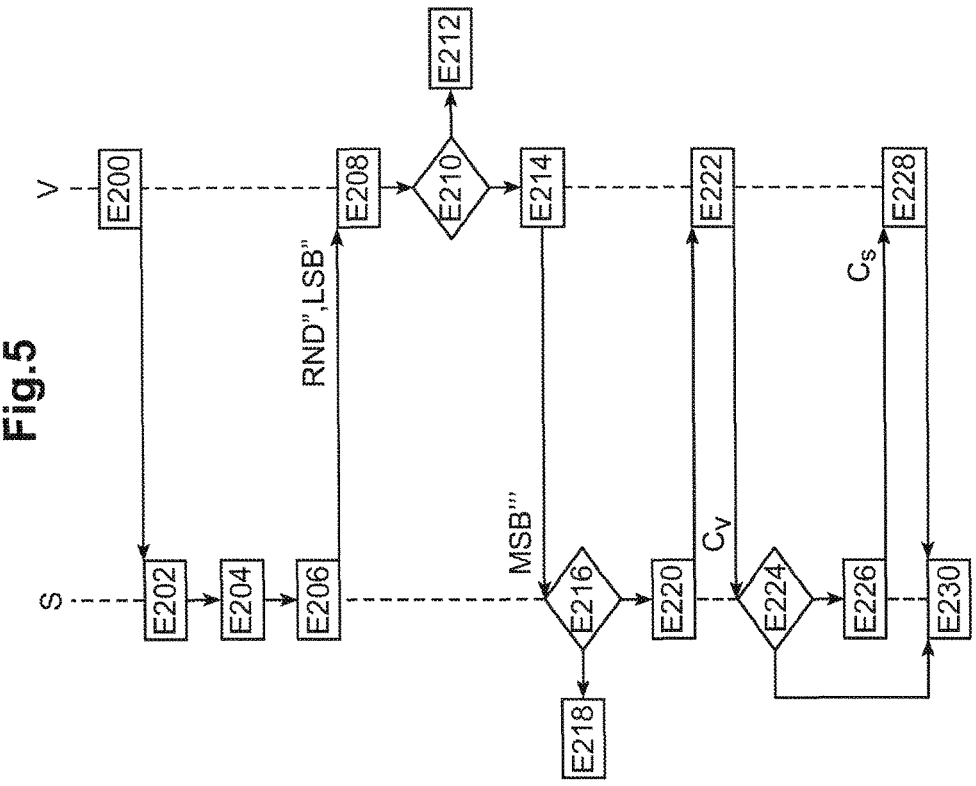
FIG. 5 shows the main the steps of a method example for resynchronizing a counter.

FIG. 5 shows the main steps of a method example for resynchronizing the counter used above.

Such a resynchronization is necessary when an operating fault is detected or the service has been interrupted, which is the case, for example, when the power supplied by the battery has been lost and a new battery is put in place.

The method described in this case requires, as explained below, an exchange of data between the server 50 (referenced S in FIG. 5) and the vehicle 10 (referenced V in FIG. 5), or more precisely the electronic control unit 11. Such an exchange of data is made possible as indicated above either via the user terminal 20 (according to the procedures already presented with reference to FIGS. 1-3), or alternatively by direct access of the electronic control unit 11 to the cell phone network 30.

The method of FIG. 5 is started when a fault is detected (for example: loss of power supply from the battery of the vehicle 10, in which case the fault is detected upon resumption of the power supply) and possibly also when a user of the vehicle requests restoring the possibility of controlling the functionality of the vehicle by means of the user terminal.

This method begins, in the step E200, with the electronic control unit 11 sending a synchronization request, possibly accompanied by a status indicator of the vehicle, to the server S.

Upon receipt of this request, the server S generates a challenge, for example a random number RND" (step E202).

The server S then calculates, in the step E204, a response RESP" associated with this challenge RND" by applying a cryptographic function f (for example that used during the mutual authentication necessary for the registration as explained above with reference to FIG. 2) using the cryptographic key PrK, which can be written as: RESP"=f(RND",PrK).

The server S can thus send, in the step E206, the challenge RND" and a part of the response RESP", in this case a least significant word LSB" forming part of the response RESP", to the vehicle V, precisely to the electronic control unit 11.

The electronic control unit 11 receives the challenge RND" and the response part LSB and in turn calculates, in the step E208, the response RESP" by applying, to the received challenge RND", the cryptographic function f using the cryptographic key PrK stored as indicated above in the storage unit 14: RESP'''=f(RND",PrK).

The electronic control unit 11 then verifies, in the step E210, that the part LSB''' (corresponding to the part of the received response RESP", in this case the least significant word) of the response RESP''' calculated in the step E208 is indeed identical to the response part LSB" received from the server S.

If this identicalness is not verified, the electronic control unit 11 carries out the step E212 which terminates the resynchronization process.

If identicalness is verified, the electronic control unit 11 sends, in the step E214, another part of the response RESP''' calculated in the step E208, in this case a most significant word MSB''', to the server S.

The server S receives this other part MSB''' from the response RESP''' and verifies, in the step E216, that the part MSB'' (corresponding to the part MSB''' of the response RESP''' received, in this case the most significant word) of the response RESP'' calculated in the step E204 is indeed identical to the response part MSB''' received from the electronic control unit 11.

If this identicalness is not verified, the server carries out the step E218 which terminates the resynchronization processor. Indeed, this means that the partner of the server S in the communication has not been able to calculate the expected response, in all likelihood as the partner is not the expected vehicle and therefore does not hold the cryptographic key PrK.

In normal operation, identicalness is verified and a mutual authentication has thus been performed between the server S and the electronic control unit 11.

The server S then triggers the continuation of the resynchronization method by sending, to the electronic control unit 11 (step E220), a request for communication of the value $C_V$ of the counter stored within the electronic control unit 11 and of the state thereof (counting in progress or having stopped).

The electronic control unit 11 receives this request and consequently sends, in the step E222, the value $C_V$ of the counter and the state of the counter (counting in progress/having stopped) to the server S.

The server S receives this information and can thus determine, in the step E224, whether the counter has stopped or whether the received value $C_V$ differs from the value $C_S$ of the counter stored within the server S by a difference greater than a predetermined threshold d (i.e. if $|C_V-C_S|>d$, where $|x|$ is the absolute value of x).

If none of these conditions is verified (i.e. when the received state indicates an active counter and the difference between the counter $C_S$ stored within the server and the counter $C_V$ stored within the electronic control unit is acceptable), it is considered that no resynchronization is necessary and the method continues directly to the step E230 described below.

If one of these conditions is verified (i.e. if the counter has stopped or if the received value $C_V$ differs from the value $C_S$ of the counter stored within the server S by a difference greater than the predetermined threshold d), the server S sends (step E226), to the electronic control unit, a command to reset the counter to the value $C_S$ (current value of the counter stored within the server S) and to start the counter.

The electronic control unit 11 receives this command and therefore starts, in the step E228, the counter which it stores, after initialization to the received value $C_S$. The electronic control unit 11 then sends a message confirming the start of the counter.

Upon receipt of this confirmation message, the server S carries out the step E230 at which the resynchronization method is terminated. The counter is then incremented simultaneously in the server S and in the electronic control unit 11 of the vehicle V, using a periodic incrementation at the period P, as explained above.

According to a possible alternative, values transmitted from the server S to the electronic control unit 11 are not used for the resynchronization, but rather the values entered (initial value I, incrementation period P) in the storage unit 14 during the production of the electronics unit. In this case, at each synchronization of the server and of the electronics entity, the counter is initialized with the initial value I stored in the storage unit 14.

The invention claimed is:

1. An electronics unit configured to be fitted in a vehicle and to control a functionality of the vehicle upon receiving a request from a user terminal, the electronics unit comprising:
   a storage unit to store a counter and an item of data representing a duration;
   means for periodically modifying the value of the counter, with a period equal to said duration;
   control means for controlling said functionality only when the counter is within a given range of values;
   means for receiving a lower limit and an upper limit, wherein the given range of values is defined between said lower limit and said upper limit;
   means for deriving a virtual key on the basis of a root key and the lower and upper limits received;
   means for sending a challenge to the user terminal,
   means for calculating an expected response according to the virtual key and to the challenge; and
   means for receiving a response from the user terminal;
   wherein the control means are furthermore designed to control said functionality only when the response received corresponds to the expected response.

2. The electronics unit as claimed in claim 1, wherein the periodic modification of the counter is a periodic incrementation of the counter.

3. The electronics unit as claimed in claim 1, wherein said functionality is the unlocking of the vehicle doors.

4. A method carried out in an electronics unit in accordance with claim 1, comprising:
   mutual authentication of the electronics unit and of a server;
   based on successful mutual authentication, initialization of the counter with an initial value stored in the storage unit.

5. The method as claimed in claim 4, wherein the initialization of the counter is performed only when an action of a user on a physical object linked to the vehicle is detected.

6. A method for sharing a time frame between a server and an electronics unit of a vehicle, comprising the implementation, by the electronics unit, of a method in accordance with claim 4, and further comprising:
   initializing a counter within the server with said initial value, stored at the server;
   periodically modifying the counter stored within the server with a period equal to said duration.

7. A method for synchronizing a server and an electronics unit in accordance with claim 1, comprising:
   mutual authentication of the electronics unit and of the server;
   in the event of successful mutual authentication, transmitting, to the electronics unit, a current value of a counter stored at the server, and initializing the counter stored in the storage unit of the electronics unit with said current value.

8. A method for synchronizing a server and an electronics unit in accordance with claim 1, comprising:
   entering the item of representative data and an initial value into the storage unit during a stage of producing the electronics unit; and
   at each synchronization of the server and of the electronics entity, initializing the counter with said initial value.

* * * * *